US010764211B2

(12) United States Patent
Isloorkar (10) Patent No.: US 10,764,211 B2
(45) Date of Patent: Sep. 1, 2020

(54) FLEXIBLE SWITCH LOGIC

(71) Applicant: Avago Technologies International Sales Pte. Limited, Singapore (SG)

(72) Inventor: Nitin Vinay Isloorkar, Santa Clara, CA (US)

(73) Assignee: Avago Technologies International Sales Pte. Limited, Singapore (SG)

( * ) Notice: Subject to any disclaimer, the term of this patent is extended or adjusted under 35 U.S.C. 154(b) by 88 days.

(21) Appl. No.: 16/165,958

(22) Filed: Oct. 19, 2018

(65) Prior Publication Data

US 2020/0127942 A1  Apr. 23, 2020

(51) Int. Cl.
| | |
|---|---|
| H04L 12/947 | (2013.01) |
| H04L 12/24 | (2006.01) |
| H04L 12/801 | (2013.01) |
| H04L 12/26 | (2006.01) |
| H04L 12/743 | (2013.01) |
| H04L 29/08 | (2006.01) |

(52) U.S. Cl.
CPC .............. *H04L 49/25* (2013.01); *H04L 41/22* (2013.01); *H04L 43/028* (2013.01); *H04L 43/12* (2013.01); *H04L 45/7453* (2013.01); *H04L 47/10* (2013.01); *H04L 67/322* (2013.01)

(58) Field of Classification Search
CPC ......... H04L 49/25; H04L 41/22; H04L 43/12; H04L 67/322; H04L 45/7453; H04L 47/10; H04L 43/028
See application file for complete search history.

(56) References Cited

U.S. PATENT DOCUMENTS

| | | | | |
|---|---|---|---|---|
| 9,184,995 | B2* | 11/2015 | Leong | H04L 41/0823 |
| 9,762,547 | B2* | 9/2017 | Binder | H04L 63/18 |
| 10,326,682 | B2* | 6/2019 | Shanbhag | H04L 67/2814 |
| 10,333,898 | B1* | 6/2019 | Moore | H04L 63/0236 |
| 10,511,536 | B2* | 12/2019 | Ludwig | H04L 47/10 |
| 10,567,259 | B2* | 2/2020 | Nagaraj | H04L 43/12 |
| 2013/0272135 | A1* | 10/2013 | Leong | H04L 41/0853 |
| | | | | 370/241 |
| 2015/0012757 | A1* | 1/2015 | Binder | G06F 7/58 |
| | | | | 713/190 |
| 2018/0270204 | A1* | 9/2018 | Binder | H04L 51/046 |

\* cited by examiner

*Primary Examiner* — Brian T O Connor
(74) *Attorney, Agent, or Firm* — Morgan, Lewis & Bockius LLP (57) ABSTRACT

Flexible switch logic packet processing includes receiving a first packet associated with a particular traffic flow, generating a switching decision behavior in a first cycle of the particular traffic flow by selecting one or more processing floors of a programmable pipeline based on a received profile signal indicating a type of processing required for the first packet, and performing packet processing on the first packet using the selected one or more processing floors of the programmable pipeline. In some aspects, an ingress packet processor is configured to generate a first switching decision behavior using the selected processing floors of a first programmable pipeline in the ingress packet processor. In other aspects, an egress packet processor is configured to perform a packet action on the passed first received packet based on a second switching decision behavior using the selected processing floors of a second programmable pipeline in the egress packet processor.

20 Claims, 10 Drawing Sheets

FLEXIBLE SWITCH LOGIC

TECHNICAL FIELD

The present disclosure relates generally to a network device for processing data, and in particular, to flexible switch logic.

BACKGROUND

Networking infrastructures are facing ever increasing demands for increased bandwidth and intelligent services for a rapidly growing number of users. Efficient power consumption is also of concern. Network switch devices that handle these user interactions, such as switches and routers, spend significant processing time performing lookups and accessing memories for every packet that is processed. For example, each packet may follow a process where 1) the packets ingress into the switch device; 2) various parameters of the packet are parsed; 3) classification is performed using tables, registers and/or fields to derive forwarding information; and 4) packet modification actions are derived, such as packet forward or drop action. As network traffic through the switch device increases, the packet processing overhead correspondingly increases. Additional processors and memory may be added to handle the increased demands, but may add cost to the switch device and may also consume real estate and power.

BRIEF DESCRIPTION OF THE DRAWINGS

Certain features of the subject technology are set forth in the appended claims. However, for purpose of explanation, several embodiments of the subject technology are set forth in the following figures.

Certain features of the subject technology are set forth in the appended claims. However, for purpose of explanation, one or more implementations of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced using one or more implementations. In one or more instances, structures and components are shown in block diagram form in order to avoid obscuring the concepts of the subject technology.

Switching behavior is traditionally implemented with "fixed" network switching decision logic. For example, the functional blocks that perform the switching behavior are hardcoded in silicon. However, the subject disclosure provides for a flexible switch logic (FSL) subsystem with a multi-block architecture that is the core of flexible switch devices. FSLs are used to process resolution logic after multiple lookups, such as MPLS processing, L2/L3 processing, and TTL selection. FSLs have characteristics that include a wide variety in function intent and complexity. In general, the FSLs process a mix of smaller control signals and larger data signals. The FSLs include IOs and logic depth of the order of a few dozens. The FSLs have no notion of closing, but rather only relative placement between tables and other user program constructs.

The FSL adds a lot of value in terms of flexibility. For example, unreasonable restrictions put on user program functions due to HW/compiler constraints are undesirable. The FSL reduces latency and area in an overall solution of implementing common protocol programs as compared to a generic lookup table architecture with none or trivial post-lookup processing elements. The FSL has the freedom to tap and populate a logical pipeline bus at will since physical restrictions are to be overcome by correct bus placement. The FSL includes a profile table to handle different packet types by indicating a type of processing required for a given packet type. The term "logical" as used herein generally refers to a type of topological structure of a network that illustrates a non-tangible representation of how data flows within a network. The term "physical" as used herein generally refers to another type of topological structure of a network that illustrates a tangible description of various components of a network.

In the subject technology, a programmable pipeline architecture includes six types of hardware blocks in the pipeline: 1) a parser, 2) match-action tables, 3) flexible switch logic subsystem, 4) special function blocks, 5) editor, and 6) bus multiplexers. The flexible switch logic subsystem will be discussed in greater detail in reference to FIGS. 3-8. In some implementations, the flexible switch logic subsystem is instantiated multiple times in an integrated circuit (e.g., a semiconductor die).

In some implementations, no packets are allowed during a compile time initialization. In some implementations, software-based logical circuitry writes to the profiles for all processing floors before initializing a state table. In some implementations, the software-based logical circuitry ensures that each half entry of the state table is written by at most one cell per clock cycle. In some implementations, the software-based logical circuitry is responsible for any state entry written during live traffic.

Figure 1:
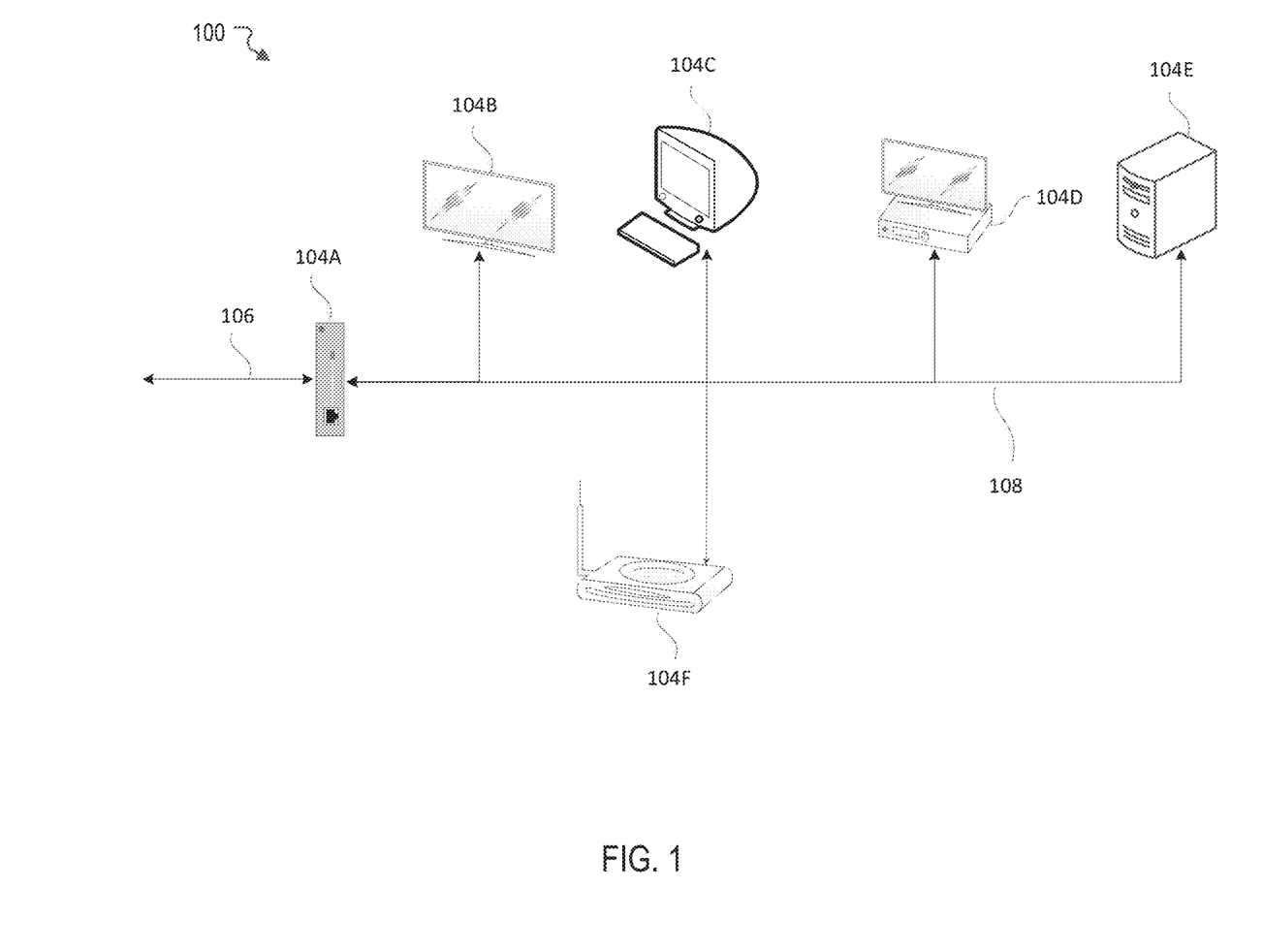
FIG. 1 illustrates an example network environment in which a network device may be implemented in accordance with one or more implementations of the subject technology.

FIG. 1 illustrates an example network environment 100 in which a flexible switch logic may be implemented in accordance with one or more implementations. Not all of the depicted components may be used, however, and one or more implementations may include additional components not shown in the figure. Variations in the arrangement and type of the components may be made without departing from the spirit or scope of the claims as set forth herein. Additional components, different components, or fewer components may be provided.

The network environment 100 includes various electronic devices 104A-F, such as one or more servers, computers, data storage devices, network components, network devices, etc. In one or more implementations, the network environment 100 includes a set of servers, a server bank, a storage area network, and/or a vast network of interconnected computers or network devices. In one or more implementations, the network environment 100 includes one or more other devices, such as, for example, one or more mobile devices, tablet devices, set-top box (STB) devices, storage devices, desktop computers, routers, switches, bridges, or any other machine or device.

The one or more electronic devices 104A-F are communicably coupled via transmission medium 108. The transmission medium 108 may include one or more of a coaxial transmission medium, a powerline transmission medium, an Ethernet transmission medium, and/or one or more devices that facilitate communications over the transmission medium 108. The electronic devices 104A-F can be computing devices such as laptop or desktop computers, smartphones, set-top boxes, peripheral devices, user input devices, tablets, televisions or other displays with one or more processors coupled thereto and/or embedded therein, or other appropriate devices that include wired and/or wireless network interfaces.

In the example network environment 100 of FIG. 1, the electronic device 104A is depicted as a switch device, the electronic device 104B is depicted as a television, the electronic device 104C is depicted as a personal computer, the electronic device 104D is depicted as a home entertainment system, the electronic device 104E is depicted as a server, and the electronic device 104F is depicted as a router. By way of non-limiting example, the data communication in the network may include wired and/or wireless communication (e.g., transmission, reception) between the electronic devices 104A-F of advertisement information, data connection setup information, traffic indication information, data frames, ranging measurements, and so forth. One or more of the electronic devices 104A-F may be and/or may include all or part of the electronic system discussed below with respect to FIG. 2.

In one or more implementations, one or more of the electronic devices 104A-F may include appropriate wireless network interfaces for establishing wireless network connections, such as Wi-Fi connections, Bluetooth connections, or generally any wireless network connections. For explanatory purposes, the subject system is primarily discussed herein with reference to a wired, e.g. Ethernet, network; however, the subject system is not limited to wired networks and may also apply to wireless networks such as, for example, 802.11 networks.

The transmission medium 108 may be, may include, or may be a part of, an Ethernet network for facilitating communication between one or more Ethernet devices, such as Power over Ethernet, Energy Efficient Ethernet, and/or any other Ethernet versions. Although the example network environment 100 includes the electronic devices 104A-F, fewer, more, and/or different electronic devices may be utilized in a network.

The network connections may be utilized by the electronic device 104A to access services/content provided by and/or provide services/content to the electronic devices 104A-E. For example, the electronic device 104A may deliver audio and/or video streams to the electronic device 104B, and/or to a device coupled to the electronic device 104B, such as an adapter, a dongle, etc. The electronic device 104A may transcode the audio and/or video streams prior to delivering the audio and/or video streams to the electronic device 104B. The electronic device 104B may output and/or present the audio and/or video streams, e.g. to a user.

The electronic device 104A may include a number of integrated circuits, or chips, that are referred to as switch chips. The switch chips may be mounted on a common substrate and/or one or more of the switch chips may be mounted on separate substrates, such as separate line cards. Each switch chip is coupled to one or more ports of the electronic device 104A and processes data units transmitted through and/or received over, the ports. For explanatory purposes, the data units may be primarily referred to herein as cells, e.g. portions of packets; however, the data units may be packets, protocol data units (PDUs), chunks, or generally any delineable data unit. To facilitate processing the data units, each of the switch chips may include one or more ingress processors, egress processors, and/or memory management units (MMUs).

In some implementations, the electronic device 104A may be a routing device, such as any layer 3 routing device, or generally any network device that routes data, such as packets. The electronic device 104A may include one or more memory modules that store a packet processing table. The packet processing table may include an index based on flow identification (Flow-ID) of a packet (e.g., internal, external) and packet processing results from a first packet in a burst. Packet processing results may include packet forwarding information, packet editing information, layer forwarding (e.g., L2/L3 forwarding), centralized processing unit (CPU) processing, quality of service (QoS) attributes, buffering information, and custom packet edits.

Figure 2:
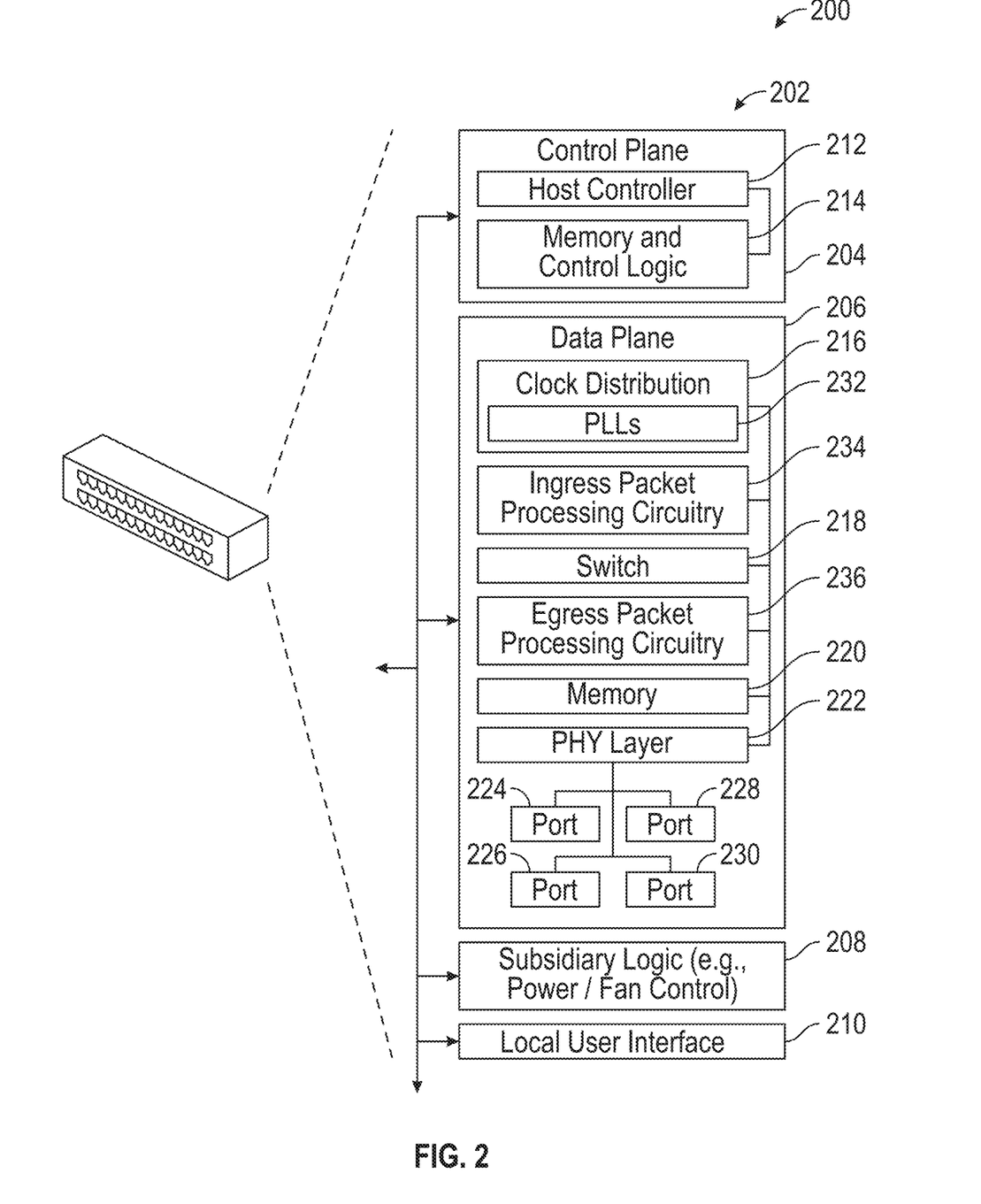
FIG. 2 illustrates a switch architecture of an example electronic device that may implement flexible switch logic in accordance with one or more implementations.

FIG. 2 illustrates a switch architecture 200 of an example electronic device 104A that may implement flexible switch logic in accordance with one or more implementations. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

The switch architecture 200 generally includes system logic 202 divided into a control plane 204, a data plane 206, subsidiary logic 208, and a local user interface 210. The control plane 204 may include one or more host controllers 212 in communication with memory and control logic 214. Just as one example, the memory and control logic 214 may store instructions executed by the host controller 212 to implement overall control, configuration, and other desired functionality in the switch architecture 200.

The subsidiary logic 208 may control specific subsystems in the switch architecture 200. As examples, the subsidiary logic 208 may control fans, power supplies, or other systems. The local user interface 210 may accept configuration input and output via any indicator, display, annunciator, text based or graphical user interface.

The data plane 206 may include a clock distribution tree 216 for providing clock signals throughout the data plane 206, a switch fabric 218 for switching data packets, and data memory 220 for buffering packets and other data on ingress or egress. The switch fabric 218 may enable communication between the ingress packet processing circuitry 234 and the egress packet processing circuitry 236. In one or more implementations, the switch 218 includes a fabric, such as a mesh fabric, or any other interconnect that provides for communication between the ingress packet processing circuitry 234 and the egress packet processing circuitry 236. The data plane 206 may also include a Physical (PHY) layer 222 that transmits and receives packets through one or more ports (e.g., the Ethernet ports 224, 226, 228, and 230). The local user interface 210 may accept clock commands that the control plane 204 or data plane 206 processes to, for instance, set clock speeds for any clock domain within the switch architecture 200. Responsive to the clock commands, the control plane 204 or data plane 206 may set, e.g., inputs and parameters for phase locked loops (PLLs) 232, or any other clock generation logic, to change the speed of clocks delivered to ingress packet processing circuitry 234, egress packet processing circuitry 236, or both. In one or more implementations, the data plane 206 may include a serializer/deserializer (SerDes) interface running at line rate.

In the switch architecture 200, data, bits of data, a data packet, a set of data, signals, a frame (referred to as "data" or "data packet"), or a multicast frame (a frame that is intended to be transmitted to multiple destinations) may arrive at or be received at or through a physical port that may logically be referred to as an ingress port. Inbound data may be processed by the ingress packet processing circuitry 234 and therefore the ingress packet processing circuitry 234 may be referred to as being associated with one or more ingress ports (e.g., 224, 226). In one or more implementations, the data packets are large, and arrive and/or be processed in smaller pieces (referred to in one or more implementations as data "cells," "segments," "chunks," or "portions"). The data packet may depart from the switch architecture 200 at or through a physical port that may be logically referred to as an egress port. Outbound data may be processed by the egress packet processing circuitry 236, and therefore the egress packet processing circuitry 236 may be referred to as being associated with one or more egress ports (e.g., 228, 230). Thus, a physical port may be logically referred to as an ingress port when data is being received at or through the port, and the same physical port may also be logically referred to as an egress port when data is being transmitted at or through the port.

The ingress packet processing circuitry 234 and the egress packet processing circuitry 236 may include one or more dedicated memories or buffers and/or may include one or more packet processors. Since the ingress packet processing circuitry 234 and the egress packet processing circuitry 236 include dedicated memories, the switch architecture 200 may not be limited by memory throughput limitations, and therefore may be highly scalable and able to provide high bandwidth aggregation.

In operation, the ingress packet processing circuitry 234 may transmit data to the egress packet processing circuitry 236 or egress ports using various data transfer techniques or switching techniques, such as a store-and-forward data transfer technique and a cut-through data transfer technique, amongst others. In the store-and-forward data transfer technique, an ingress port associated with the ingress packet processing circuitry 234 may receive data segments of a data packet, such as data segments of a multicast frame. The ingress packet processing circuitry 234 may store the data segments in a memory or a buffer within the ingress packet processing circuitry 234 until the entire data packet has been received. Once the entire data packet has been received and stored in the memory of the ingress packet processing circuitry 234, the ingress packet processing circuitry 234 may forward the data packet to the egress packet processing circuitry 236. In the cut-through data transfer technique, an ingress port associated with the ingress packet processing circuitry 234 may receive data segments of a data packet, such as portions of a data packet. The ingress node 220 may transmit the portions of the data packet to the egress packet processing circuitry 236 without storing the data segments, or the entire data packet, in an internal buffer or memory of the ingress packet processing circuitry 234. The ingress packet processing circuitry 234 may replicate the portions of the data packet, as necessary, for transmission to the egress packet processing circuitry 236.

In one or more implementations, one or more of the control plane 204, the data plane 206, the subsidiary logic 208, the local user interface 210, the ingress packet processing circuitry 234, the switch 218, the egress packet processing circuitry 236, the PHY layer 222, or one or more portions thereof, may be implemented in software (e.g., subroutines and code), may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both.

The subject technology provides for data plane flexibility using an FSL subsystem, where an end-user can flexibly modify the switching decision behavior during traffic to suit the needs of the end-user. For example, the FSL subsystem provides the capability of at-line-rate profiling and processing. The at-line-rate capability enables execution of the switching decision logic in each cycle. For example, for a first cycle, one packet requiring a particular decision behavior (e.g., Virtual Extensible Local Area Network (VXLAN)) is executed in a FSL instance. In a next cycle, another packet requiring another particular decision behavior (e.g., MPLS) can be executed in the same FSL instance. In particular, the interconnect mesh, processing units and arrangement of the processing units allow the end user to program the switching decision behavior at a target speed (e.g., at line rate).

Figure 3:
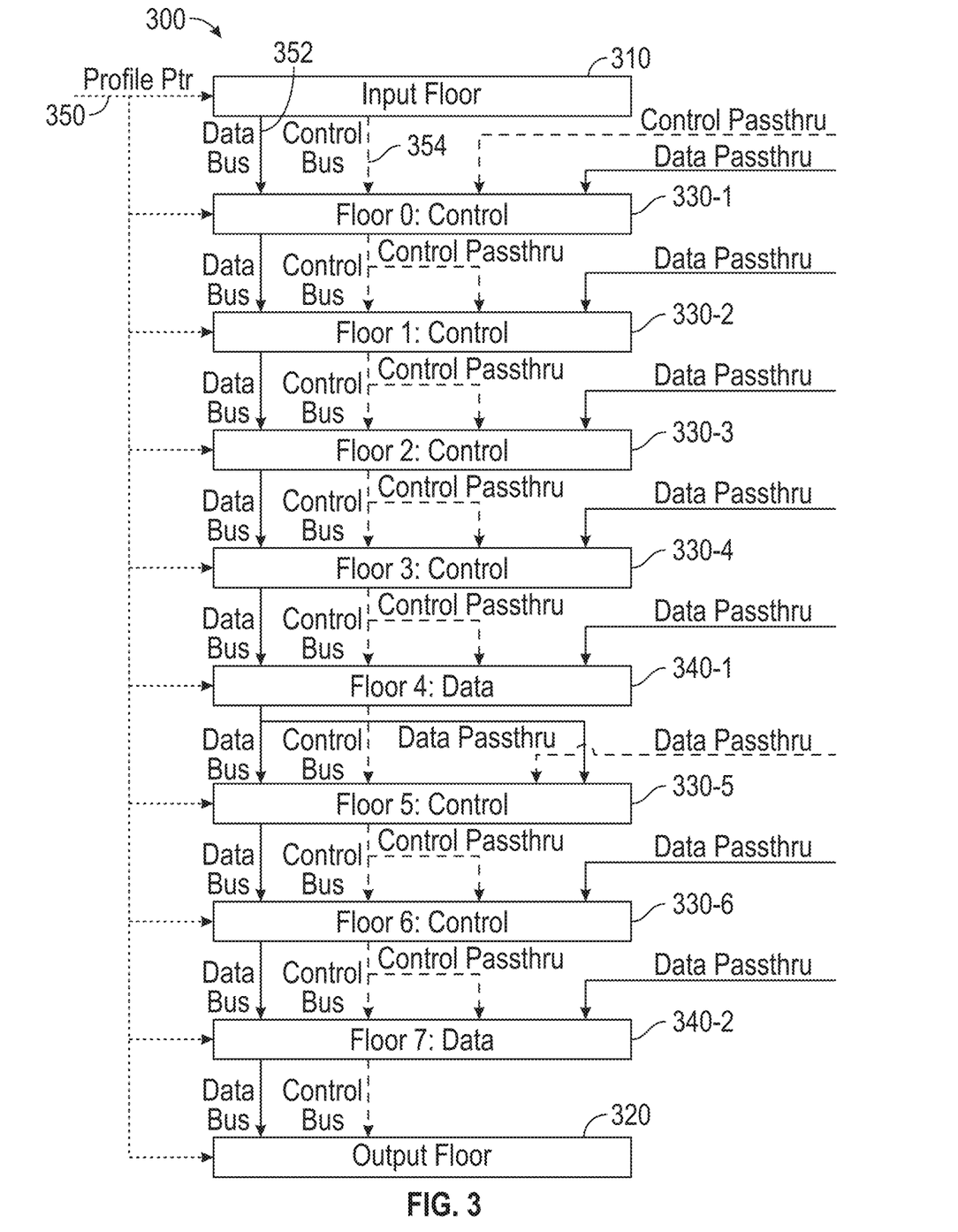
FIG. 3 illustrates a block diagram of an example of a flexible switch logic pipeline architecture in accordance with one or more implementations of the subject technology.

FIG. 3 illustrates a block diagram of an example of a flexible switch logic pipeline architecture 300 in accordance with one or more implementations of the subject technology. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

As depicted in FIG. 3, multiple instances of an FSL block in the flexible switch logic pipeline architecture 300 for performing processing in the programmable pipeline. The FSL subsystem includes two primary components: 1) processing floors, and 2) a fully flexible mesh of interconnects. The flexible switch logic pipeline architecture 300 may be implemented in the ingress packet processing circuitry 234 and/or the egress packet processing circuitry 236. For example, the FSL blocks are spread across multiple points in the ingress packet processing circuitry 234 and egress packet processing circuitry 236.

In some aspects, the FSL processing occurs after a group of table lookups, such as adaptation and forwarding table lookups, are performed. In some aspects, every FSL instance in the programmable pipeline can have different hardware configuration parameters based on the amount and type of processing required at a particular stage of the programmable pipeline.

The FSL subsystem includes multiple types of processing floors. As depicted in FIG. 3, the FSL subsystem includes, for example, five types of processing floors. Each of the processing floors may include: 1) special instruction processing units (PU), and 2) a specific arrangement of PUs. The PU may be associated with a custom instruction set. The PUs are arranged in a specific placement to execute a desired switching decision behavior. In operation, the capabilities of the interconnect mesh, PUs and the specific arrangement allows the FSL subsystem to operate at a target data rate (e.g., 12.8 Tbps or greater).

The FSL is a programmable pipeline component that performs processing on pipeline signals based on user-defined programs. For example, the FSL receives object data and command controls as input, and the FSL writes back on the same buses. In some aspects, the object data is about 512 bits wide and the command controls is about 256 bits wide, however, the width of the buses is arbitrary and can vary depending on implementation.

An FSL instance is formed with multiple processing floors. In some implementations, the term "floor" refers to a slab of logic that accepts 1 or 2 clocks and is dedicated to a specific purpose. Each FSL instance has the following processing floors, arranged from input to output: 1) one input floor (e.g., 310), 2) zero or more control floors (e.g., 330), 3) zero or more data floors (e.g., 340), and 4) one output floor (e.g., 320). In some implementations, the FSL instance includes a dual processing floor (e.g., a combination of a control floor and a data floor). Further for explanatory purposes, the blocks of the FSL instance are described herein as occurring in serial, or linearly. However, the blocks of the FSL instance need not be arranged in the order shown and/or one or more of the blocks of the FSL instance need not be included.

The input floor 310 serves as an input multiplexer that populates the data and control buses going to subsequent processing floors from the main pipeline buses (e.g., control bus 354, data bus 352). The input floor 310 has logic circuitry controlled with 1 clock or 2 clocks depending on implementation. The control floor 330 is configured to generate new control information on the control bus. Each control floor (e.g., 330-1, 330-2, 330-3, 330-4, 330-5, 330-6) has logic circuitry controlled with 1 clock. The data floor (e.g., 340) is configured to generate new data information on the data bus 352. Each data floor (e.g., 340-1, 340-2) has logic circuitry controlled with 1 clock. The output floor 320 serves as an output multiplexer that populates the generated FSL data into the main pipeline buses (e.g., control bus 354, data bus 352). The output floor has logic circuitry controlled with 1 clock. The dual floor (not shown) is configured to generate both control information on the control bus with the control floor portion and generate new data information on the data bus with the data floor portion, which may be generated concurrently to one another or consecutively of one another depending on implementation.

In some implementations, each processing floor includes a profile signal 350 that controls its operation, which is programmed by a compiler. For example, the profile signal 350 is a pointer to a profile table (or data structure) for programming switching decision logic of each processing floor by setting values of the profile data structure to the switching decision logic and selecting a particular interconnection between the processing floors of an FSL instance. In this respect, the programmed switching decision logic produces the desired switching decision behavior (e.g., VXLAN, MPLS, etc.). In some aspects, all profile tables are of a same depth, with a same policy pointer via the profile signal 350 being pipelined and fed to all of the profile tables. The profile signal 350 may be driven by a data structure (e.g., a logical table select), having only the first input floor profile pointer (e.g., the profile signal 350) as its policy output.

The flexible switch logic pipeline architecture 300 depicted in FIG. 3 contains 6 control floors and 2 data floors. In some example, the data bus 352 is 512 bits wide and operated on at an 8-bit granularity. In other example, the control bus is 256 bits wide and operated on at a 1-bit granularity. The number and ordering of processing floors and the bus widths can vary per instance depending on implementation.

Both the data and control busses are divided into a main bus and a pass-through bus. The main bus is directly populated and re-written by a corresponding processing floor, while the pass-through bus is conditionally updated in a next stage. The entire bus (e.g., including both data and control busses) is available for consumption for corresponding blocks.

In some implementations, none of the pipeline input/output signals are flopped (e.g., controlled by a clock cycle). In some aspects, the flopping of pipeline signals is performed outside individual pipeline blocks to remove flop redundancy within the programmable pipeline.

Figure 4:
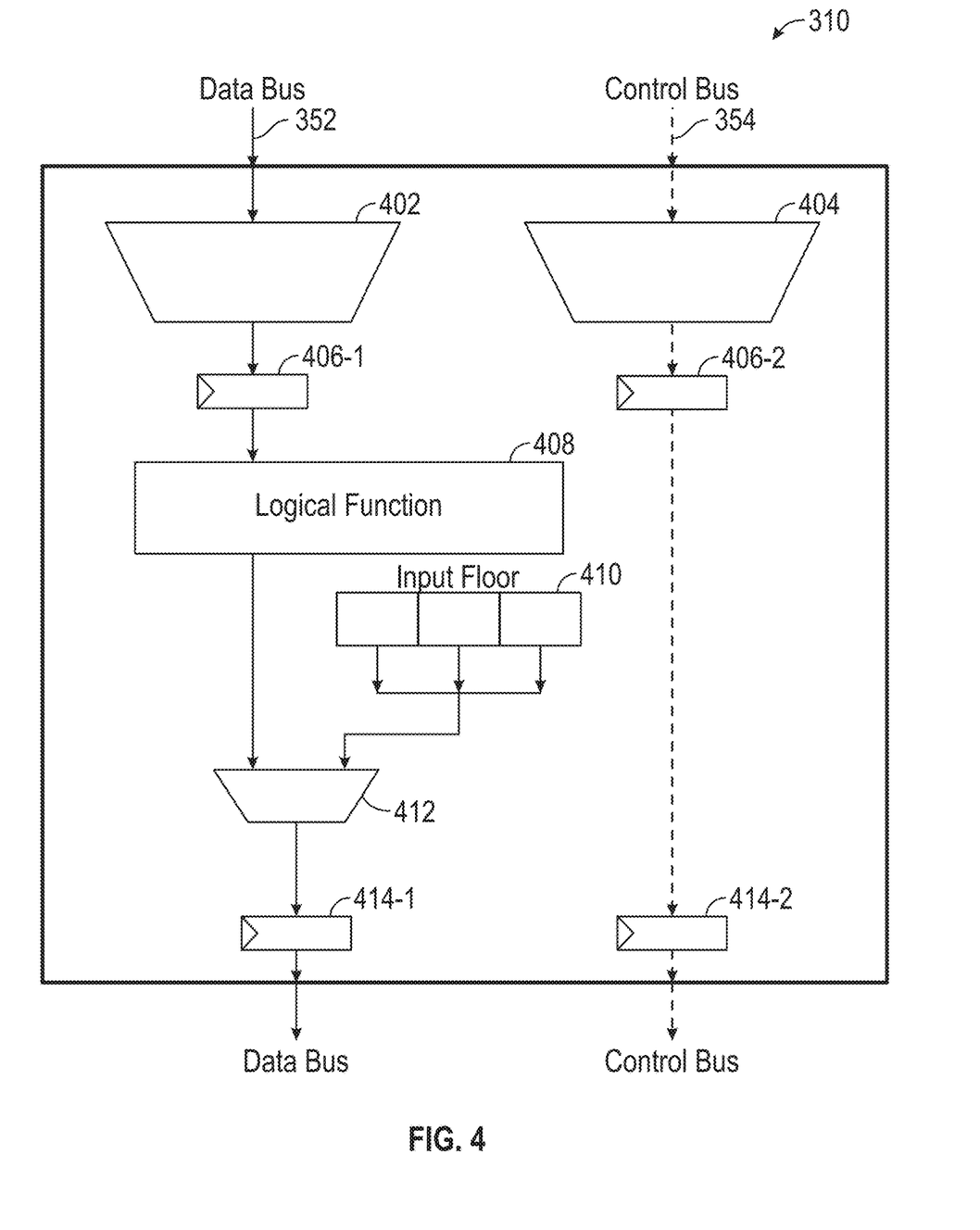
FIG. 4 illustrates a block diagram of an example architecture of an input floor in accordance with one or more implementations of the subject technology.

FIG. 4 illustrates a block diagram of an example architecture of the input floor 310 in accordance with one or more implementations of the subject technology. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

The input floor 310 includes multiplexers 402, 404, and 412, registers 406-1, 406-2, 414-1, and 414-2, logic circuitry 408 and 410. The register 406-1 is coupled to the output of the multiplexer 402 for registering input data signals on the data bus 352. The register 406-2 is coupled to the output of the multiplexer 404 for registering input control signals on the control bus 354. The registers 406-1 and 406-2 are configured to accept 1 clock and part of a first stage of the input floor 310, and the registers 414-1 and 414-2 are configured to accept 1 clock and part of a second stage of the input floor 310. The clocks received by the registers (e.g., 406-1, 406-2, 414-1, 414-2) may be the same in some implementations, or may be different in other implementations. In some implementations, the input floor 310 does not include the second stage that comprises the registers 414-1, 414-2 and, thus, the input floor 310 may accept 1 clock in this example.

The input floor 310 populates the initial data bus 352 and control bus 354 from the main pipeline buses. For example, any signals intended for processing anywhere in the FSL instance are selected in the input floor. For data signals, the signals are selected at a predefined width granularity (e.g., 8-bit granularity). In some aspects, consecutive chunks of data signals are concatenated and right shifted by the logic circuitry 408. The shifted result is masked and a predetermined number of low-significant bits are selected. The selected LSB bits are then multiplexed with a constant bank value produced by the logic circuitry 410. For control signals, the signals are selected at a predetermined width of granularity.

Figure 5:
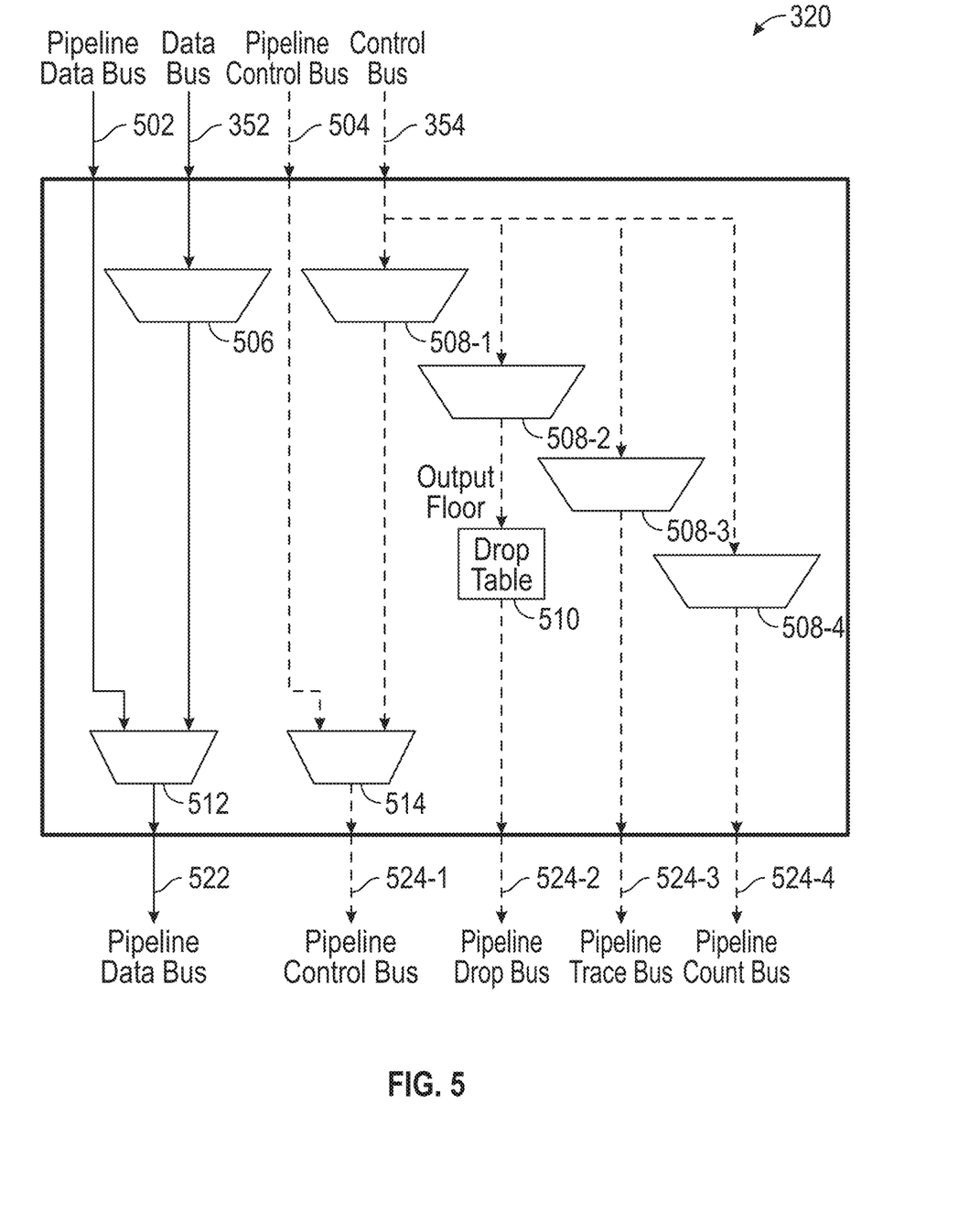
FIG. 5 illustrates a block diagram of an example architecture of an output floor in accordance with one or more implementations of the subject technology.

FIG. 5 illustrates a block diagram of an example architecture of the output floor 320 in accordance with one or more implementations of the subject technology. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

The output floor 320 includes multiplexers 506, 508-1, 508-2, 508-3, 508-4, 512 and 514, and a drop table circuit 510. The multiplexer 506 receives input data signals on the data bus 352 and the multiplexers 508-1, 508-2, 508-3, 508-4 receive the same input control signals on the control bus 354. The multiplexer 512 is coupled to the output of the multiplexer 506 for multiplexing its output with input data signals on the pipeline data bus 502. The multiplexer 514 is coupled to the output of the multiplexer 508-1 for multiplexing its output with input control signals on the pipeline control bus 504.

The output floor 320 populates the main pipeline buses with final processed data signals on a pipeline data bus 522, final processed control signals on a pipeline control bus 524-1 and processed signals (e.g., drop, trace, count) on auxiliary buses, such as a pipeline drop bus 524-2, a pipeline trace bus 524-3, and a pipeline count bus 524-4. For data signals, the signals are selected at a predefined width granularity (e.g., 8-bit granularity). In some aspects, the selected result is right shifted. The shifted result is then multiplexed with the input floor data signals.

In some implementations, for drop signals, drop table triggers are selected at a predetermined width granularity and driven to the pipeline drop bus 524-2. In some implementations, for trace signals, the signals are selected at a predetermined width granularity and driven to the pipeline trace bus 524-3. In some implementations, for count signals, the signals are selected at a predetermined width granularity and driven to the pipeline count bus 524-3. In some implementations, for control signals, the signals are selected at a predetermined width granularity and driven to the pipeline control bus 524-1. In some aspects, the predetermined width is the same for the drop signals, trace signals, count signals and control signals. In other aspects, the predetermined width is different for the drop signals, trace signals, count signals and control signals. In some examples, the predetermined width is one bit, but the predetermined width is arbitrary and can vary depending on implementation.

In some implementations, the output floor 320 includes an additional multiplexer to select which container to update the bus when multiple containers are shared across the data bus 352 and control bus 354. For each bus (e.g., control, data) that the FSL can update, an update bitmap is generated, where each container that the FSL updates is statically driven to a logical state (e.g., '1'), so that the external bus update multiplexer selects FSL data where applicable. In some aspects, the update bitmap also disambiguates from control and data updates for a container if applicable.

The drop table circuit 510 is coupled to the output of the multiplexer 508-2. In some implementations, the drop table circuit 510 is a logical circuitry producing a table containing drop codes and drop strengths. The FSL can support a predetermined number of drop triggers across all of its profiles (e.g., 350). Hardware circuitry may be configured to select triggered drop table entry with highest index and updates to bus. Software-based logical circuitry may program drop table entries such that a triggerable higher index value has a higher drop strength. In an example, the first drop code field on the output bus is made the same as a selected drop code. In some implementations, an external drop resolution logical circuit compares the pipeline drop bus 524-2 with an existing pipeline drop state and updates the pipeline drop bus 524-2.

Figure 6:
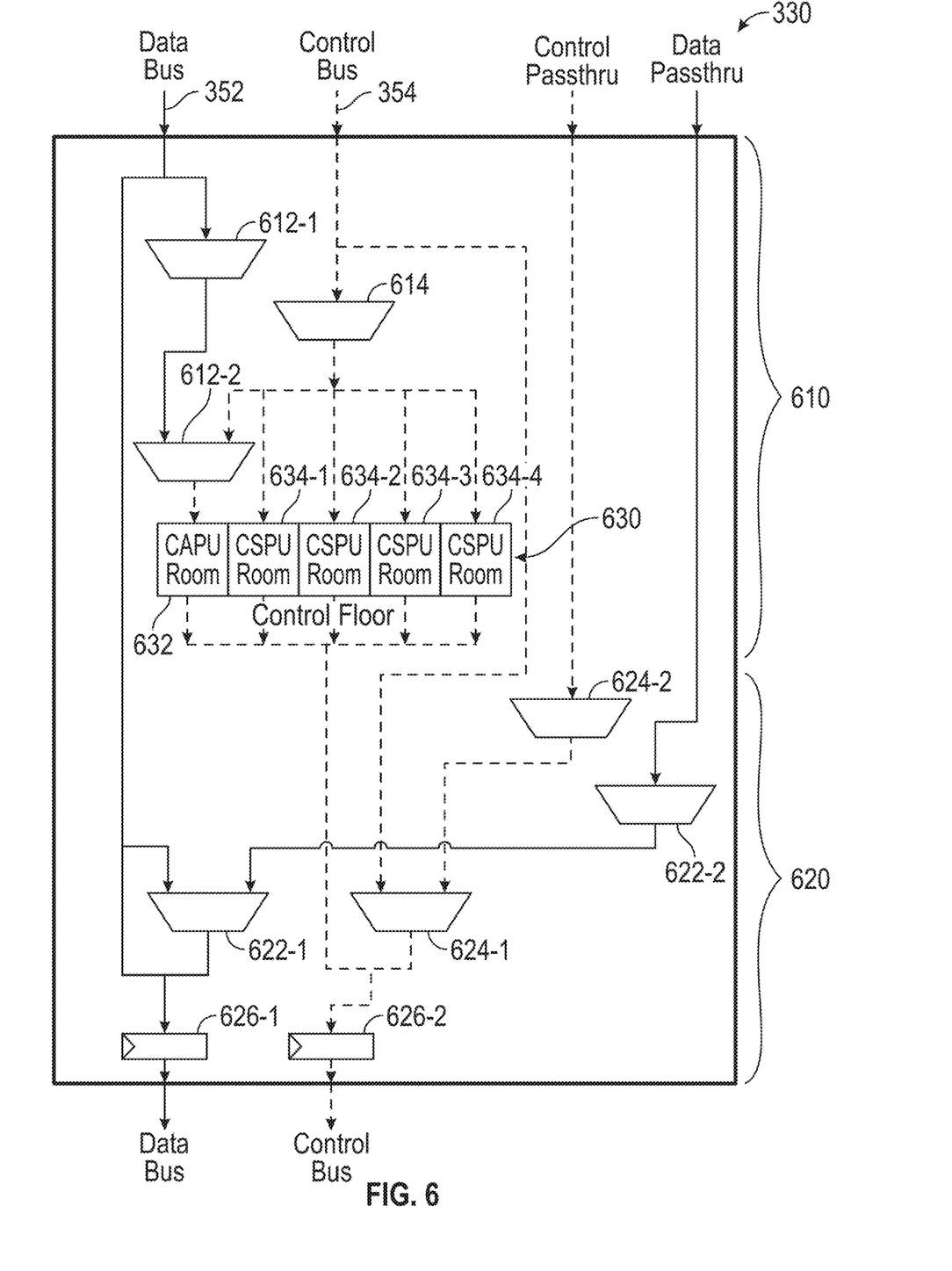
FIG. 6 illustrates a block diagram of an example architecture of a control floor in accordance with one or more implementations of the subject technology.

FIG. 6 illustrates a block diagram of an example architecture of the control floor 330 in accordance with one or more implementations of the subject technology. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

The control floor 330 populates the control bus going through the FSL. The control floor 330 includes multiplexers 612-1, 612-2, 614, 622-1, 622-2, 624-1, 624-2, registers 626-1, 626-2, and logic circuitry 630. The register 626-1 is coupled to the output of the multiplexer 622-1 for registering output data signals on the data bus 352. The register 626-2 is coupled to the output of the multiplexer 624-1 for registering output control signals on the control bus 354. The registers 626-1 and 626-2 are configured to accept 1 clock. In some aspects, the control floor 330 includes a front-end section 610 and a back-end section 620. The front-end section 610 includes the multiplexers 612-1, 612-2 and 614, and the logic circuitry 630. The back-end section 620 includes the multiplexers 622-1, 622-2, 624-1, 624-2, and the registers 626-1, 626-2.

The logic circuitry 630 includes a CAPU cell 632 ("CAPU Room") and CSPU cells ("CSPU Room") 634-1, 634-2, 634-3, 634-4. The logic circuitry 630 is coupled to the output of the multiplexer 612-2 and 614. In particular, the CAPU room 632 receives the output from the multiplexer 612-2, and the CSPU rooms receive the same output from the multiplexer 614. In some implementations, the CAPU cells (e.g., 632) are used for control arithmetic and wide Boolean processing. The CAPU cell 632 may include a lookup table that has no latency. In some implementations, the CSPU cells (e.g., 634-1, 634-2, 634-3, 634-4) are used for Boolean processing.

Figure 7:
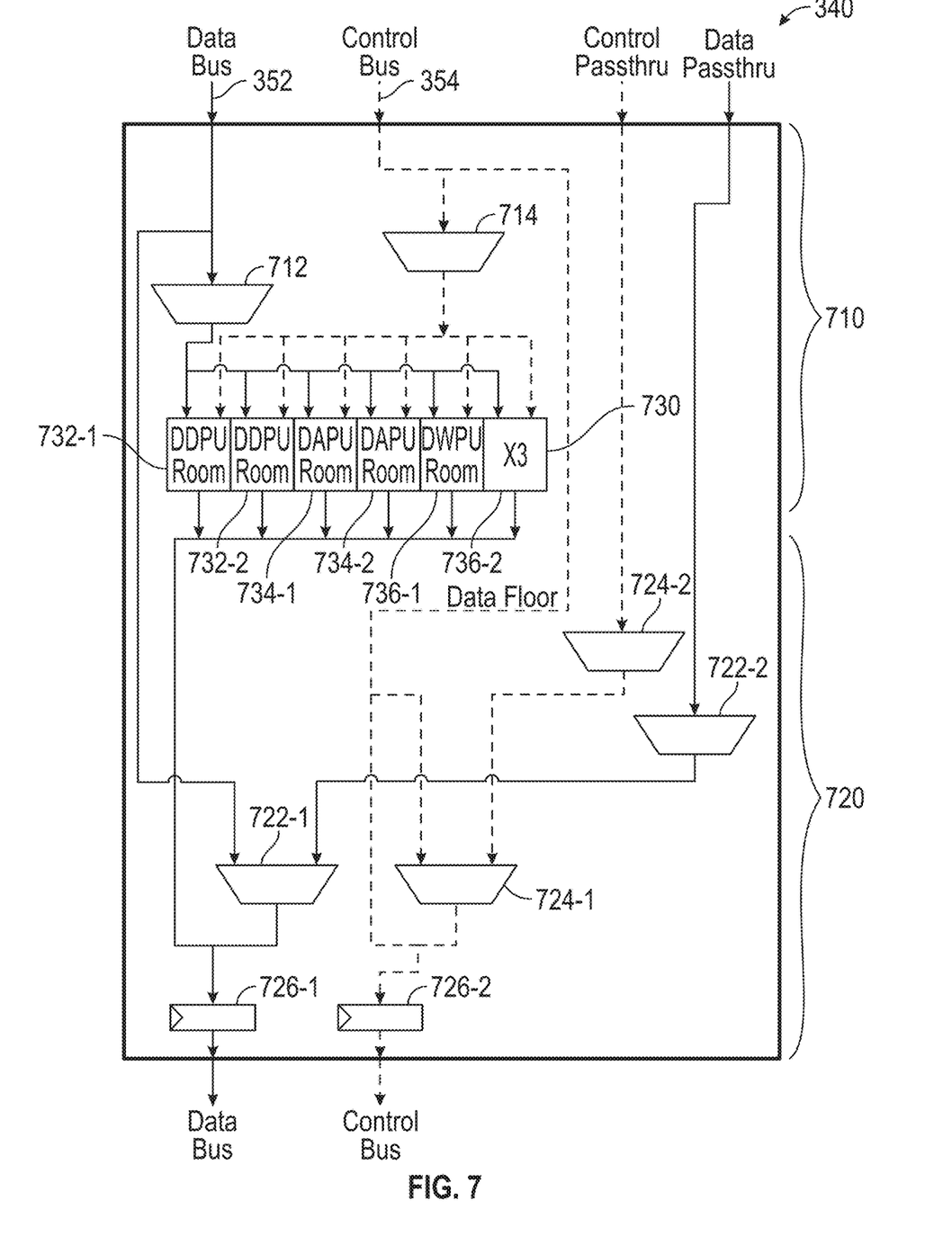
FIG. 7 illustrates a block diagram of an example architecture of a data floor in accordance with one or more implementations of the subject technology.

FIG. 7 illustrates a block diagram of an example architecture of the data floor 340 in accordance with one or more implementations of the subject technology. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

The data floor 340 populates the data bus 352 going through the FSL. The data floor 340 includes multiplexers 712, 714, 722-1, 722-2, 724-1, 724-2, registers 726-1, 726-2, and logic circuitry 730. Like the control floor 330 of FIG. 6, the data floor 340 includes a front-end section 710 and a back-end section 720. The front-end section 710 includes the multiplexers 712 and 714, and the logic circuitry 730. The back-end section 720 corresponds to the back-end section 620, in which back-end section 720 includes the multiplexers 722-1, 722-2, 724-1, 724-2 that respectively correspond to the multiplexers 622-1, 622-2, 624-1, 624-2, and the registers 726-1, 726-2 that respectively correspond to the registers 626-1, 626-2. The register 726-1 is coupled to the output of the multiplexer 722-1 for registering output data signals on the data bus 352. The register 726-2 is coupled to the output of the multiplexer 724-1 for registering output control signals on the control bus 354. The registers 726-1 and 726-2 are configured to accept 1 clock.

The logic circuitry 730 includes a DDPU cells ("DDPU Room") 732-1, 732-2, DAPU cells ("DAPU Room") 734-1, 734-2, and DWPU cells 736-1, 736-2. The logic circuitry 730 is coupled to the output of the multiplexer 712 and 714. In particular, each of the DDPU rooms 732-1, 732-2, DAPU rooms 734-1, 734-2, and DWPU cells 736-1, 736-2 receive outputs from both the multiplexers 712 and 714. In some implementations, the DAPU cells (e.g., 734-1, 734-2) are mainly used for data arithmetic and wide Boolean processing. The DAPU cells (e.g., 734-1, 734-2) also access a state table (not shown), which can be conditionally processed and updated. In some implementations, the DDPU cells (e.g., 732-1, 732-2) are used for Boolean processing, with some basic arithmetic functionality. In some implementations, the DWPU cells (e.g., 736-1, 736-2) are used for data multiplexing.

Figure 8:
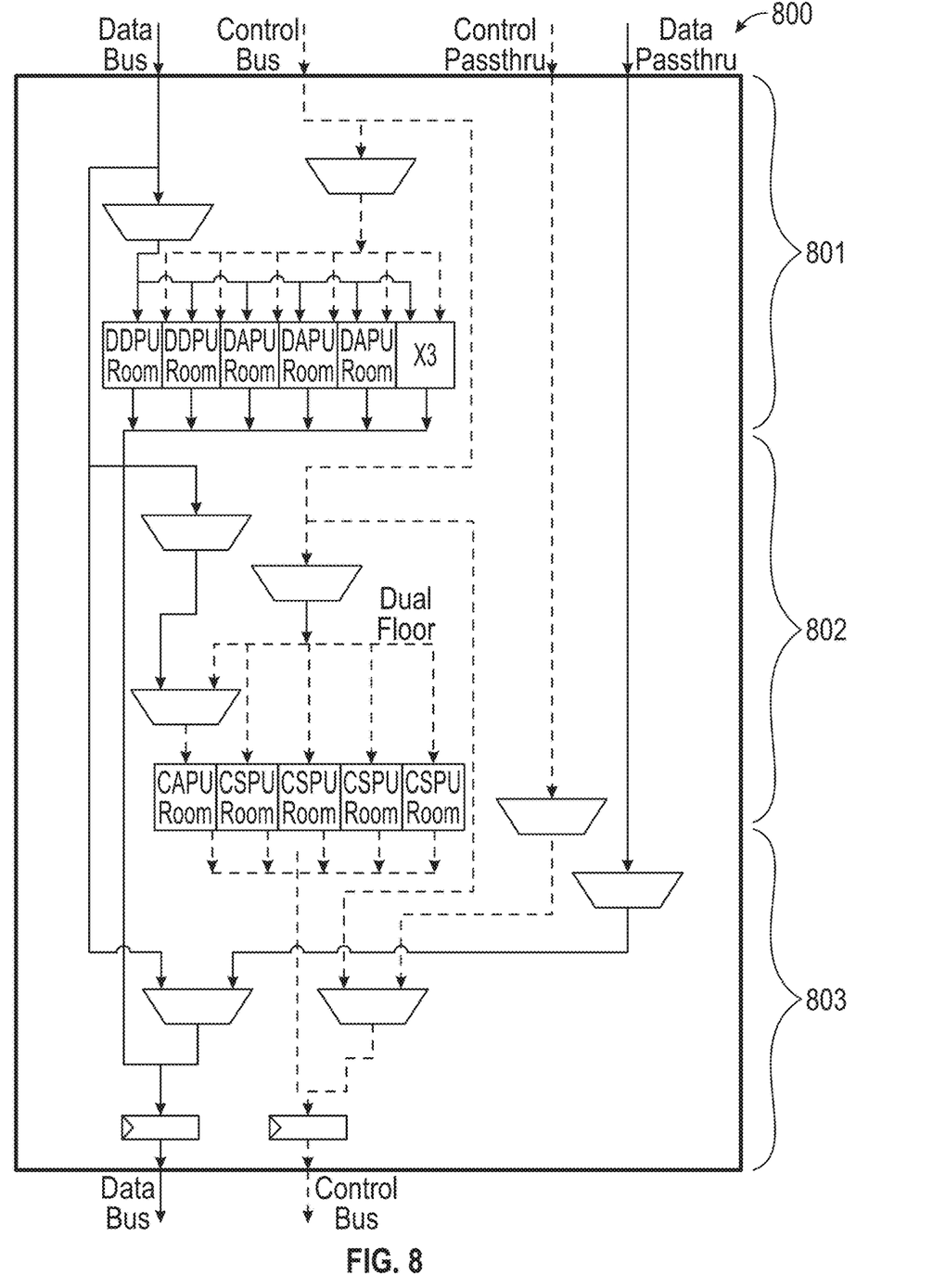
FIG. 8 illustrates a block diagram of an example architecture of a dual floor in accordance with one or more implementations of the subject technology.

FIG. 8 illustrates a block diagram of an example architecture of a dual floor 800 in accordance with one or more implementations of the subject technology. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

The dual floor 800 is a combination of a control floor (e.g., 330) and a data floor (e.g., 340). As depicted in FIG. 8, the dual floor architecture includes a first section 801, a second section 802 and a third section 803. The first section 801 corresponds to the front-end section (e.g., 710) of the data floor 340. The second section 802 corresponds to the front-end section (e.g., 610) of the control floor 330. The third section 803 corresponds to the back-end sections (e.g., 620, 720) of the control floor 330 and the data floor 340.

In one or more implementations, one or more of the input floor 310, output floor 320, control floor 330, data floor 340, drop table 510, control floor processing unit circuit 630, data floor processing unit circuit 730, or one or more portions thereof, may be implemented in software (e.g., subroutines and code), may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both.

Figure 9:
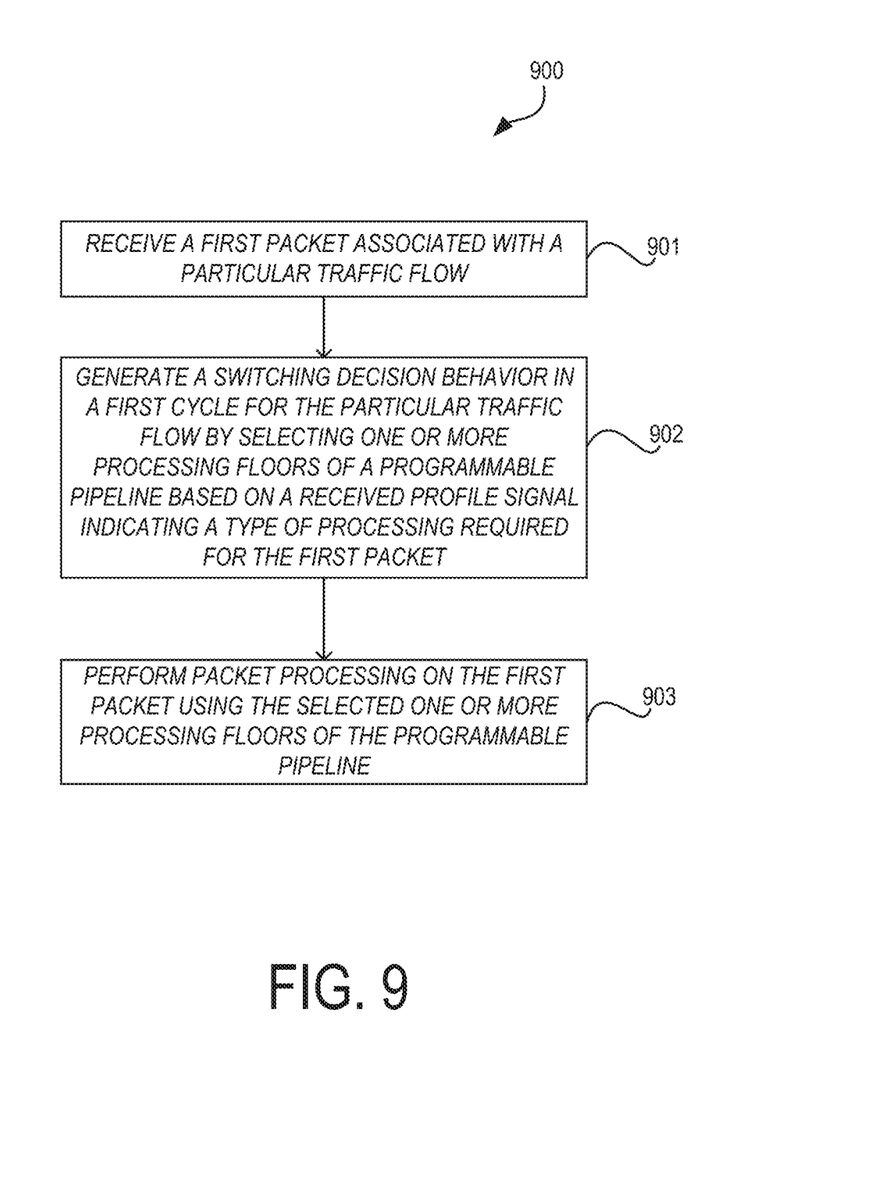
FIG. 9 illustrates a process of executing a switching decision behavior in a network device with flexible switch logic in accordance with one or more implementations of the subject technology.

FIG. 9 illustrates a process 900 of executing a switching decision behavior in a network device with flexible switch logic in accordance with one or more implementations of the subject technology. Further for explanatory purposes, the blocks of the sequential process 900 are described herein as occurring in serial, or linearly. However, multiple blocks of the process 900 may occur in parallel. In addition, the blocks of the process 900 need not be performed in the order shown and/or one or more of the blocks of the process 900 need not be performed.

The process 900 starts at step 901, where a first packet associated with a particular traffic flow is received for packet processing. Next, at step 902, a switching decision behavior in a first cycle of the particular traffic flow is generated with a processor by selecting processing floors of a programmable pipeline based on a received profile signal indicating a type of processing required for the first packet. Subsequently, at step 903, packet processing on the first packet is performed with the processor using the selected processing floors of the programmable pipeline.

Figure 10:
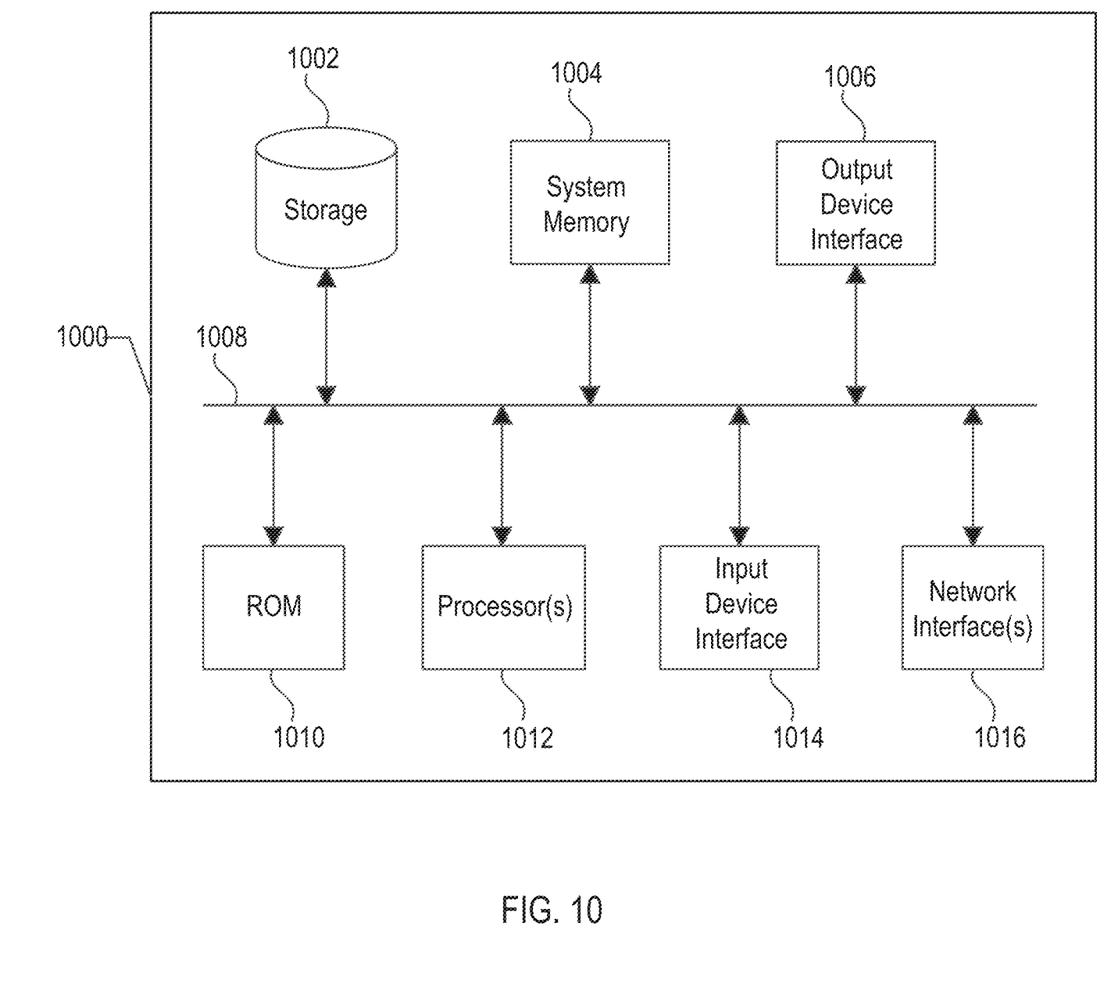
FIG. 10 conceptually illustrates an electronic system with which any implementations of the subject technology are implemented.

FIG. 10 conceptually illustrates an electronic system 1000 with which one or more implementations of the subject technology may be implemented. The electronic system 1000, for example, can be a network device, a media converter, a desktop computer, a laptop computer, a tablet computer, a server, a switch, a router, a base station, a receiver, a phone, or generally any electronic device that transmits signals over a network. Such an electronic system 1000 includes various types of computer readable media and interfaces for various other types of computer readable media. In one or more implementations, the electronic system 1000 is, or includes, one or more of the electronic devices 104A-E. The electronic system 1000 includes a bus 1008, one or more processing unit(s) 1012, a system memory 1004, a read-only memory (ROM) 1010, a permanent storage device 1002, an input device interface 1014, an output device interface 1006, and a network interface 1016, or subsets and variations thereof.

The bus 1008 collectively represents all system, peripheral, and chipset buses that communicatively connect the numerous internal devices of the electronic system 1000. In one or more implementations, the bus 1008 communicatively connects the one or more processing unit(s) 1012 with the ROM 1010, the system memory 1004, and the permanent storage device 1002. From these various memory units, the one or more processing unit(s) 1012 retrieves instructions to execute and data to process in order to execute the processes of the subject disclosure. The one or more processing unit(s) 1012 can be a single processor or a multi-core processor in different implementations.

The ROM 1010 stores static data and instructions that are needed by the one or more processing unit(s) 1012 and other modules of the electronic system. The permanent storage device 1002, on the other hand, is a read-and-write memory device. The permanent storage device 1002 is a non-volatile memory unit that stores instructions and data even when the electronic system 1000 is off. One or more implementations of the subject disclosure use a mass-storage device (such as a magnetic or optical disk and its corresponding disk drive) as the permanent storage device 1002.

Other implementations use a removable storage device (such as a floppy disk, flash drive, and its corresponding disk drive) as the permanent storage device 1002. Like the permanent storage device 1002, the system memory 1004 is a read-and-write memory device. However, unlike the permanent storage device 1002, the system memory 1004 is a volatile read-and-write memory, such as random access memory. System memory 1004 stores any of the instructions and data that the one or more processing unit(s) 1012 needs at runtime. In one or more implementations, the processes of the subject disclosure are stored in the system memory 1004, the permanent storage device 1002, and/or the ROM 1010. From these various memory units, the one or more processing unit(s) 1012 retrieves instructions to execute and data to process in order to execute the processes of one or more implementations.

The bus 1008 also connects to the input device interface 1014 and the output device interface 1006. The input device interface 1014 enables a user to communicate information and select commands to the electronic system. Input devices used with the input device interface 1014 include, for example, alphanumeric keyboards and pointing devices (also called "cursor control devices"). The output device interface 1006 enables, for example, the display of images generated by the electronic system 1000. Output devices used with the output device interface 1006 include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 10, the bus 1008 also couples the electronic system 1000 to one or more networks (not shown) through one or more network interfaces 1016. In this manner, the computer can be a part of one or more network of computers (such as a local area network ("LAN"), a wide area network ("WAN"), or an Intranet, or a network of networks, such as the Internet. Any or all components of the electronic system 1000 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In some implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as application specific integrated circuits (ASICs) or field programmable gate arrays (FPGAs). In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (e.g., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration." Any embodiment described herein as "exemplary" or as an "example" is not necessarily to be construed as preferred or advantageous over other embodiments. Furthermore, to the extent that the term "include," "have," or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method of flexible switch logic packet processing, the method comprising:
    receiving a first packet associated with a particular traffic flow;
    generating, by a processor, a switching decision behavior in a first cycle of the particular traffic flow by selecting one or more processing floors of a programmable pipeline based on a received profile signal indicating a type of processing required for the first packet, wherein the received profile signal is a pointer to a profile data structure for programming switching decision logic of the one or more processing floors; and
    performing, by the processor, packet processing on the first packet using the selected one or more processing floors of the programmable pipeline.

2. The method of claim 1, further comprising:
    receiving a second profile signal indicating a different type of processing required for the first packet; and
    modifying the switching decision behavior during live traffic based on the received second profile signal.

3. The method of claim 1, further comprising:
    executing different switching decision logic in each of a plurality of cycles based on different profile signals received in respective ones of the plurality of cycles.

4. The method of claim 1, further comprising:
    determining that the first packet requires a first type of packet processing for a first cycle of a plurality of cycles; and
    programming a first switching decision behavior at a target line rate by selecting one or more of first data floors of a plurality of processing floors or first control floors of the plurality of processing floors based on the first type of packet processing.

5. The method of claim 4, further comprising:
    receiving a second packet associated with the particular traffic flow, the second packet being received subsequent to the first packet;
    determining that the second packet requires a second type of packet processing for a second cycle of the plurality of cycles, the second cycle being subsequent to the first cycle; and
    programming a second switching decision behavior at the target line rate by selecting one or more of second data floors of the plurality of processing floors or second control floors of the plurality of processing floors based on the second type of packet processing, the second switching decision behavior being different from the first switching decision behavior.

6. The method of claim 1, further comprising:
    writing to a plurality of switch profiles for all of a plurality of processing floors prior to initializing a state table associated with the programmable pipeline.

7. The method of claim 6, further comprising:
    writing to the state table during live traffic to record a state entry corresponding to the switching decision behavior.

8. The method of claim 1, further comprising:
    programming a first instance of a flexible switch logic circuit at a first stage of the programmable pipeline to perform first packet processing on the first packet, wherein the first instance is programmed by a first set of configuration parameters; and
    programming a second instance of the flexible switch logic circuit at a second stage of the programmable pipeline to perform second packet processing on the first packet, wherein the second instance is programmed by a second set of configuration parameters different from the first set of configuration parameters.

9. The method of claim 1, further comprising:
receiving a profile signal for controlling operation of each of the plurality of processing floors; and
driving the profile signal to each of the plurality of processing floors; and
selecting data signals and control signals at predefined width granularities at each of the plurality of processing floors based on the profile signal.

10. A switch device comprising:
an ingress packet processor configured to generate a first switching decision behavior using one or more processing floors of a first programmable pipeline in the ingress packet processor based on a received profile signal, perform ingress packet processing on a first received packet based on the switching decision behavior, and pass the first received packet and the received profile signal to an egress packet processor; and
the egress packet processor configured to perform a packet action on the passed first received packet based on a second switching decision behavior generated using one or more processing floors of a second programmable pipeline in the egress packet processor based on the received profile signal, wherein the received profile signal is a pointer to a profile data structure for programming switching decision logic of the one or more processing floors in the first and second programmable pipelines.

11. The switch device of claim 10, wherein the plurality of processing floors includes an input floor and an output floor, wherein the input floor serves as an input multiplexer that populates data and control buses going to subsequent processing floors of the plurality of processing floors on a plurality of buses, and wherein the output floor serves as an output multiplexer that populates generated flexible switch logic (FSL) data onto the plurality of buses.

12. The switch device of claim 11, wherein the plurality of processing floors includes one or more data floors configured to generate the FSL data on a data bus of the plurality of buses.

13. The switch device of claim 11, wherein the plurality of processing floors includes one or more control floors configured to generate control information on a control bus of the plurality of buses.

14. The switch device of claim 10, wherein each of the plurality of processing floors includes special instruction processing units and a specific arrangement of the special instruction processing units, wherein one or more of the special instruction processing units is configured to perform Boolean operations and arithmetic operations.

15. The switch device of claim 14, wherein the special instruction processing units are arranged in a specific placement to execute a desired switching decision behavior.

16. A system comprising:
memory; and
one or more processors coupled to the memory and configured to perform a number of acts comprising:
instructions comprising:
receiving a first packet associated with a particular traffic flow;
generating, by a processor, a switching decision behavior in a first cycle of the particular traffic flow by selecting one or more processing floors of a programmable pipeline based on a received profile signal indicating a type of processing required for the first packet, wherein the received profile signal is a pointer to a profile data structure for programming switching decision logic of the one or more processing floors; and
performing, by the processor, packet processing on the first packet using the selected one or more processing floors of the programmable pipeline.

17. The system of claim 16, wherein the acts further comprise:
receiving a second profile signal indicating a different type of processing required for the first packet; and
modifying the switching decision behavior during live traffic based on the received second profile signal.

18. The system of claim 16, wherein the acts further comprise:
executing different switching decision logic in each of a plurality of cycles based on different profile signals received in respective ones of the plurality of cycles.

19. The system of claim 16, wherein the acts further comprise:
determining that the first packet requires a first type of packet processing for a first cycle of a plurality of cycles; and
programming a first switching decision behavior at a target line rate by selecting one or more of first data floors of a plurality of processing floors or first control floors of the plurality of processing floors based on the first type of packet processing.

20. The system of claim 19, wherein the acts further comprise:
receiving a second packet associated with the particular traffic flow, the second packet being received subsequent to the first packet;
determining that the second packet requires a second type of packet processing for a second cycle of the plurality of cycles, the second cycle being subsequent to the first cycle; and
programming a second switching decision behavior at the target line rate by selecting one or more of second data floors of the plurality of processing floors or second control floors of the plurality of processing floors based on the second type of packet processing, the second switching decision behavior being different from the first switching decision behavior.

* * * * *